United States Patent
Stauder et al.

(10) Patent No.: US 8,233,743 B2
(45) Date of Patent: Jul. 31, 2012

(54) METHOD AND DEVICE FOR DETECTING THE ORIENTATION OF AN IMAGE

(75) Inventors: Jürgen Stauder, Montreuil/ille (FR); Jean-Ronan Vigouroux, Rennes (FR); Bertrand Chupeau, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 406 days.

(21) Appl. No.: 10/584,323

(22) PCT Filed: Jan. 4, 2005

(86) PCT No.: PCT/EP2005/050022
§ 371 (c)(1), (2), (4) Date: Jun. 26, 2006

(87) PCT Pub. No.: WO2005/069219
PCT Pub. Date: Jul. 28, 2005

(65) Prior Publication Data
US 2007/0116355 A1  May 24, 2007

(30) Foreign Application Priority Data

Jan. 6, 2004 (FR) .................................. 04 00067

(51) Int. Cl.
*G06K 9/32* (2006.01)
*G09G 5/00* (2006.01)
(52) U.S. Cl. ......... 382/296; 382/293; 382/297; 345/619
(58) Field of Classification Search .................. 382/287, 382/289, 297
See application file for complete search history.

(56) References Cited

U.S. PATENT DOCUMENTS

| | | | |
|---|---|---|---|
| 5,077,811 A * | 12/1991 | Onda | 382/290 |
| 5,471,549 A | 11/1995 | Kuroso et al. | |
| 6,185,343 B1 | 2/2001 | Ikeda et al. | |
| 6,744,537 B1 * | 6/2004 | Chiba et al. | 358/473 |
| 2002/0171744 A1 | 11/2002 | Kaku | |
| 2005/0046702 A1 * | 3/2005 | Katayama et al. | 348/222.1 |

FOREIGN PATENT DOCUMENTS

| | | |
|---|---|---|
| EP | 0710003 | 5/1996 |
| EP | 1059608 | 12/2000 |
| JP | 04195485 | 7/1992 |
| JP | 09128550 | 5/1997 |
| JP | 10206134 | 8/1998 |
| JP | 11-205654 | 7/1999 |
| JP | 2002-344725 | 11/2002 |

OTHER PUBLICATIONS

Wang, J., Zhang, Y., Chen, Z., Zhang, Y., "Image Disorientation Auto-Recovery." Cornell University Computer Science Technical Reports, Feb. 1999. http://hdl.handle.net/1813/7383.*
Search Report Dated May 9, 2005.

* cited by examiner

*Primary Examiner* — Stephen R Koziol
*Assistant Examiner* — Nirav G Patel
(74) *Attorney, Agent, or Firm* — Tutunjian & Bitetto, P.C.

(57) ABSTRACT

The invention relates to a method and a device for detecting the orientation of an image in a set of images. All images in this set of images contain at least one similar object. The method proposes to choose one image in this set of images as being a reference image. The orientation of the other images is detected based on the orientation of this reference image.

8 Claims, 2 Drawing Sheets

METHOD AND DEVICE FOR DETECTING THE ORIENTATION OF AN IMAGE

Figure 1A:
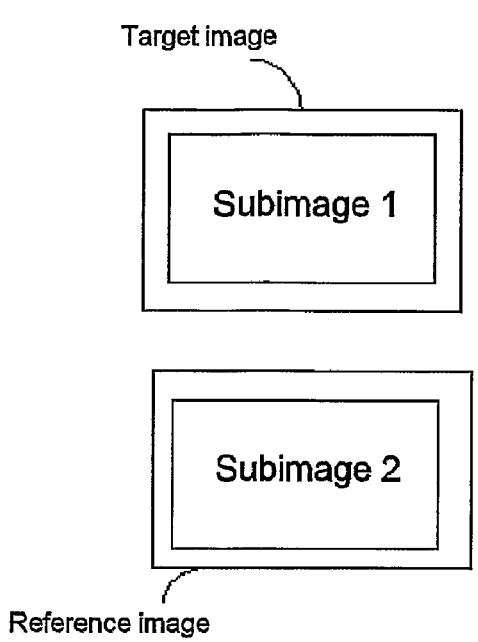

The invention relates to a device and a process for detecting the orientation of an image in a set of images.

This application claims the benefit, under 35 U.S.C. §365 of International Application PCT/EP05/050022, filed Jan. 4, 2005, which was published in accordance with PCT Article 21(2) on Jul. 28, 2005 in English and which claims the benefit of French patent applications No. 0400067, filed Jan. 6, 2004.

The invention relates more generally to the automatic detection of the orientation of an image that may possibly also contain text.

Like scanners, digital cameras generate photos which are often viewed on a screen, such as a computer screen. These images may be viewed correctly, that is to say in the right orientation or in a sense that does not allow the user to view them without having to turn his head to the left or to the right, or even to lower his head.

Specifically, sensing apparatus, such as digital cameras, can capture images in several senses, and in particular it is not uncommon for a user to take some of his photos in portrait mode and others in landscape mode. The photos thus taken are then transferred to a computer and all viewed in the same sense. Some will therefore be correctly viewed while others will require a 90, 180 or 270 degree rotation to be viewed correctly.

Certain sensing devices and in particular certain digital cameras possess orientation sensors that detect a rotation of the objective and transmit a rotation cue obtained from the sensor with the image. This allows the viewing device, by virtue of the rotation cue, to automatically perform a rotation of the image so that the latter appears in the correct sense.

Other devices use methods for extracting the low-level or high-level characteristics of the image. This makes it possible to analyse the content of the image in terms of colour, texture and also in terms of semantic content.

However, such devices are not robust for all types of images.

The invention relates more particularly to the automatic rotation of images in viewing devices not receiving any orientation cue from the sensing device and based on the orientation of other images.

Accordingly, the invention relates to a method for detecting the orientation of an image in a set of images, comprising the steps of:
  choosing a reference image from among the set of images,
  detecting the orientation of said image as a function of the orientation of the said reference image.

It frequently happens that the user takes several images representing the same scene, certain images being taken in portrait mode and others in landscape mode. The detection of a reference image from among these images may make it possible to detect the orientation of the other images representative of the same scene or of a similar-content scene. This happens especially frequently in respect of images representing a person in a landscape, the user wishing in certain images to photograph the landscape and in others to make the person stand out by taking a close-up shot.

Figure 1B:
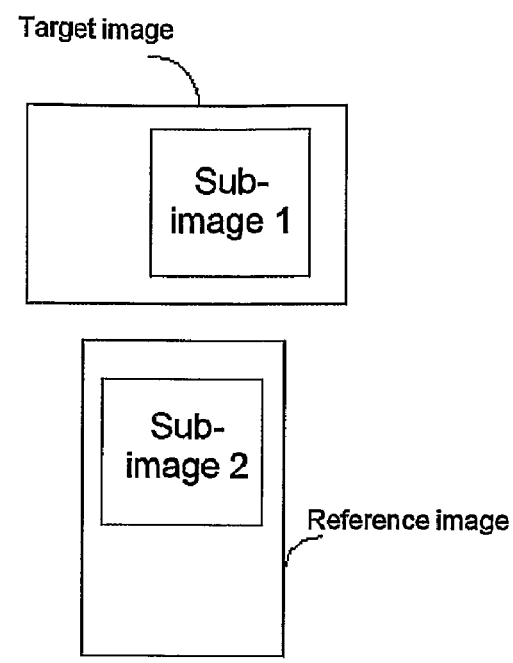
Figure 2:
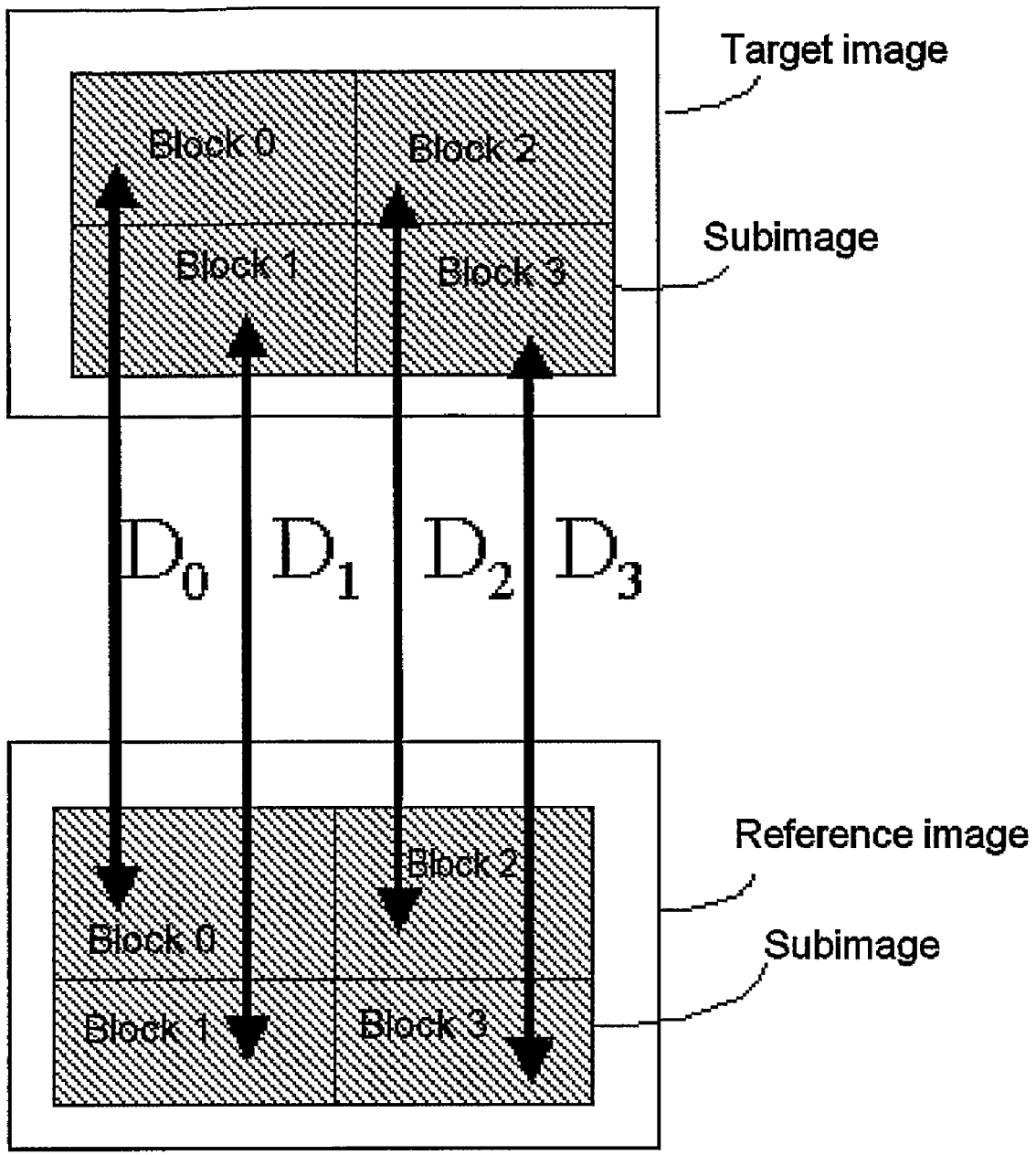

The invention will be better understood and illustrated by means of advantageous, wholly nonlimiting exemplary embodiments and modes of implementation, with reference to the appended drawings, in which:
  FIGS. 1a and 1b represent examples of decomposition into subimages,
  FIG. 2 represents a decomposition of the subimages into blocks, As indicated in FIGS. 1a and 1b, in the target image whose orientation is sought as well as in a reference subimage is positioned a subimage.

According to FIGS. 1a and 1b, the subimages are of smaller size than the image in which it is positioned. It is also possible for the subimages to be identical to the images.

The two subimages have the same relative size with respect to the image in which they are positioned. The two subimages have the same width/height ratio.

In the case where one or both subimages are smaller than the respective image in which they lie, the subimage is positioned in such a way as to obtain a minimum distance between the subimage of the reference image and the subimage of the target image whose orientation one wishes to detect. To this end, several positions of the subimages are tested and the best position is retained.

In another embodiment, the subimage is positioned at the centre of the image for the reference image and for the target image.

In another embodiment, the subimage is positioned according to a fixed rule depending on the class of the image. This presupposes that the image is classed previously according to a type which may for example be the type of scene (town, landscape, interior scene, person, etc.). It is possible to define a rule as follows: for landscape and interior scenes, the subimage is placed in the centre of the image; for town scenes, the subimage is placed at the bottom of the image.

In yet another embodiment, the subimage is placed according to a fixed rule depending on the presence and on the position of objects in the image. This involves the prior detection of objects in the image. Object can also include face. The rule possibly then being to centre the subimage on the object.

When the subimages are positioned in the reference image and in the target image, four measurements of visual distance are performed. The four measurements are performed:
  between the subimage of the target image and the subimage of the reference image,
  between the subimage of the target image and the subimage of the reference image having undergone a rotation of 90 degrees,
  between the subimage of the target image and the subimage of the reference image having undergone a rotation of 180 degrees,
  between the subimage of the target image and the subimage of the reference image having undergone a rotation of 270 degrees, To do this, the subimages of the reference image and of the target image are sliced up into blocks A*B, A vertically and B horizontally. FIG. 2 illustrates an example of the slicing into blocks, where A and B are equal to 2.

This slicing is aimed at complying with the non-stationarity of the images processed (the various zones of the images exhibit very different contents). The higher the number of blocks, the more this effect will be taken into account.

The number A*B should not however exceed a certain threshold depending on the resolution of the images in order to contain enough information.

The four measurements of distance D between the target image and reference image are calculated thus:

$$D = \sum_{i=0}^{(A*B)-1} w_i D_i$$

The distances $D_i$ represent the four distances D0, D1, D2, D3 between the four blocks of the images, as indicated in FIG. 2.

A weighting factor $w_i$ is applied for each block. The weighting can depend either on a classification of the blocks according to their significance or on a measure of confidence in respect of the calculation of the distances.

Each distance $D_i$ is calculated from M particular distances $d_m$ according to the following formula:

$$D_i = \sum_{m=0}^{M-1} v_m d_m$$

m representing the number of descriptors used for the calculation of a distance. The descriptors possibly being colour, texture for example.

The calculation of the distance $d_m$ is carried out using processes known to the person skilled in the art. It is possible to effect colour histogram differences, contour histogram differences, the difference of subband energies, the difference of responses of directional filters so as to measure these distances.

A weighting factor $v_m$ is applied for each distance $d_m$ so as to take account of the confidence of calculation of the m distances.

The reference images are images whose orientation is known a priori. The orientation of these images may be obtained through various methods, and in particular by detecting for example objects in these images or faces, but it is also possible to index them manually by the user. It is also possible to use methods different from the method proposed by the present invention making it possible to detect the orientation of an image and these methods may be used to detect the orientation of the reference image. Such a method is described for example in European Patent Application 1107182 filed in the name of the company Eastman Kodak Company on 17 Nov. 2000 and entitled "determining orientation of images containing blue sky".

When several reference images are available to the method, the choice of the reference image is performed by making a calculation of J distances $E_j$ between the given image and the reference images available to the method.

Each distance $E_j$ is calculated from L particular distances $e_l$ according to the following formula:

$$E_j = \sum_{l=0}^{L-1} q_l e_l$$

A weighting factor $q_l$ is applied to each distance $e_l$ calculated.

Each distance $e_l$ calculated is calculated according to known processes, as indicated previously in respect of the distances $d_m$.

The reference image for which the distance with the target image is the smallest is then chosen.

Subsequently the measurements of distances $D_i$ such as indicated previously are calculated as is D.

D is therefore calculated between the target image and the reference image in four positions (turned by 0, 90, 180 or 270 degrees).

The smallest distance indicates the rotation that the target image must undergo in order to be viewed in the correct sense. For example, if the smallest distance is that between the target image and the reference image turned by 270 degrees, then the target image must be turned by 207 degrees so as to be viewed in the correct sense.

The invention claimed is:

1. Method for detecting the orientation of images in a set of captured images representing a similar scene, all the images in said set of captured images containing at least one similar object, wherein the method comprises the steps of:

choosing at least one reference image from the set of captured images, the reference image having an orientation that is known a priori, wherein said choosing comprises selecting, for each target image in said set of captured images, a single reference image among a plurality of reference images whose orientations are known a priori, wherein said selected reference image is the reference image that has a minimum distance to said target image among the plurality reference images; and detecting, by a hardware processor, orientation of said target image as a function of the orientation of said selected reference image.

2. Method according to claim 1, comprising a step of calculating a visual distance between the reference image and the at least one other image.

3. Method according to claim 2, comprising a step of calculating the visual distance between the at least one other image and the reference image for different orientations of the reference image, wherein the different orientations include the at least one other image and the reference image being provided in a first orientation, the reference image having undergone a rotation of 90 degrees, 180 degrees, and 270 degrees with respect to the first orientation.

4. Method according to claim 3, comprising a step of determining a subimage in the reference image and a subimage in the at least one other image, the calculation of the visual distance between the at least one other image and the reference image being performed on the respective subimages.

5. Method according to claim 4, wherein said subimages have the same size.

6. Method according to claim 4, wherein said subimages are centered with respect to the images in which they are positioned.

7. Method according to claim 4, wherein said subimages are positioned in such a way that the visual distance between said subimages are minimal.

8. Method according to claim 4, wherein said subimages have a same width to height ratio.

* * * * *